(12) United States Patent
Moore (10) Patent No.: US 9,490,649 B2
(45) Date of Patent: Nov. 8, 2016

(54) SYSTEM AND METHOD FOR WIRELESS CHARGING

(75) Inventor: Douglas Alan Moore, Alameda, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 503 days.

(21) Appl. No.: 13/495,995

(22) Filed: Jun. 13, 2012

(65) Prior Publication Data

US 2013/0335020 A1  Dec. 19, 2013

(51) Int. Cl.
*H02J 7/00* (2006.01)
*H02J 7/02* (2016.01)
*H02J 5/00* (2016.01)
*H01R 13/66* (2006.01)
*H01R 24/78* (2011.01)
*H02G 3/14* (2006.01)

(52) U.S. Cl.
CPC ........... *H02J 7/025* (2013.01); *H01R 13/6675* (2013.01); *H01R 24/78* (2013.01); *H02G 3/14* (2013.01); *H02J 5/005* (2013.01)

(58) Field of Classification Search
CPC ........ H02J 7/025; H02J 5/005; H02J 7/0044; H02J 7/0052; H02J 17/00; H04B 5/0037; H01Q 1/2225
USPC .................................................. 320/108, 109
See application file for complete search history.

(56) References Cited

U.S. PATENT DOCUMENTS

| | | | |
|---|---|---|---|
| 6,967,462 B1 | 11/2005 | Landis | |
| 7,471,062 B2 | 12/2008 | Bruning | |
| 7,654,855 B2 | 2/2010 | Liao | |
| 7,696,722 B2 * | 4/2010 | Utschig et al. | 320/114 |
| 7,868,585 B2 | 1/2011 | Sarnowsky et al. | |
| 7,868,589 B2 | 1/2011 | McSweyn et al. | |
| 7,936,147 B2 | 5/2011 | Kook | |
| 8,024,012 B2 | 9/2011 | Clevenger et al. | |
| 8,145,180 B2 * | 3/2012 | Brown et al. | 455/343.1 |
| 2006/0238365 A1 | 10/2006 | Vecchione et al. | |
| 2009/0058361 A1 | 3/2009 | John | |
| 2009/0096413 A1 * | 4/2009 | Partovi et al. | 320/108 |
| 2010/0171461 A1 * | 7/2010 | Baarman et al. | 320/108 |
| 2010/0181961 A1 * | 7/2010 | Novak | H02J 7/025 320/108 |
| 2010/0201202 A1 * | 8/2010 | Kirby et al. | 307/104 |

(Continued)

FOREIGN PATENT DOCUMENTS

| | | |
|---|---|---|
| DE | 102008017618 | 11/2009 |
| DE | 102008031767 | 1/2010 |

(Continued)

*Primary Examiner* — Brian Ngo
(74) *Attorney, Agent, or Firm* — Snell & Wilmer LLP (57) ABSTRACT

A system and method to integrate a wireless charging apparatus and system into an existing or a standard wall electrical receptacle housing is disclosed. The system may utilize a transmitter that includes an antenna coupled with a controller that operates with a power converter for the wireless transmittal of an electrical signal to a receiver associated with an electrical device to be charged. An indicator may be illuminated or otherwise notify a user of the charging capability or status of the wireless charging apparatus of system. The wireless charging apparatus or system may also include a standard electrical socket for providing a wired electrical connection. A standard wall plate coupled with the wall electrical receptacle housing accommodates the transmitter and the electrical socket.

25 Claims, 6 Drawing Sheets

(56) References Cited

U.S. PATENT DOCUMENTS

| | | | |
|---|---|---|---|
| 2010/0225272 A1* | 9/2010 | Kirby et al. | 320/108 |
| 2010/0277120 A1* | 11/2010 | Cook et al. | 320/108 |
| 2011/0057606 A1 | 3/2011 | Saunamaki | |
| 2011/0115429 A1 | 5/2011 | Toivola et al. | |
| 2011/0115431 A1* | 5/2011 | Dunworth | G06Q 30/0267 320/108 |
| 2011/0175569 A1* | 7/2011 | Austin | B60L 11/1824 320/109 |
| 2011/0241615 A1 | 10/2011 | Yeh | |
| 2011/0260681 A1* | 10/2011 | Guccione et al. | 320/108 |
| 2012/0007555 A1 | 1/2012 | Bukow | |
| 2012/0083228 A1 | 4/2012 | Baumert et al. | |
| 2012/0091959 A1* | 4/2012 | Martin et al. | 320/109 |
| 2012/0104997 A1* | 5/2012 | Carobolante | 320/108 |
| 2012/0109797 A1* | 5/2012 | Shelton et al. | 705/34 |
| 2012/0113645 A1* | 5/2012 | Liao et al. | 362/253 |
| 2012/0139484 A1* | 6/2012 | Gunderman et al. | 320/108 |
| 2014/0021918 A1* | 1/2014 | Ichikawa et al. | 320/109 |

FOREIGN PATENT DOCUMENTS

| | | |
|---|---|---|
| JP | 2010-279198 | 12/2010 |
| JP | 2011/249229 | 12/2011 |
| KR | 2002063050 | 8/2002 |
| KR | 2010005698 | 1/2010 |
| WO | WO 2007-044636 | 4/2007 |
| WO | WO 2009-047768 | 4/2009 |

\* cited by examiner

SYSTEM AND METHOD FOR WIRELESS CHARGING

BACKGROUND

1. Field

The present disclosure relates generally to improvements in wireless charging and more particularly pertains to a system and method to integrate a wireless charging apparatus into an existing power receptacle.

2. Description of the Related Art

The number of electrical devices relying on battery power has increased steadily in modern times. These devices can range among cellular phones, gaming devices, electric vehicles, portable computing devices, cameras, toys, robots and medical devices. As the functionality of these electrical devices increases and designers load more options into their products, the demand on the batteries powering their functionality is also increasing. Oftentimes, a user taking full advantage of the capabilities of their devices must frequently recharge their device or face the consequence of a dead or drained battery. In these situations, the user needs access to and/or must remember to bring the corresponding power charging cords or charging stations and have available an appropriate electrical socket. This is often undesirable and inconvenient. For example, in airports it is common to see travelers sitting uncomfortably on the floor or jockeying for prime locations near an available electrical receptacle in order to recharge their devices for use en route. Thus, a more efficient system and method of charging devices is desired.

SUMMARY

The above needs are successfully met via the disclosed system and method. In view of the above described problem, it is an object of the present disclosure to provide a wireless charging system. In various embodiments, a system including a wireless charge transmitter configured to be housed in a standard wall electrical receptacle housing in place of a standard electrical socket and in electrical communication with a power source is disclosed. In one embodiment, the wireless charge transmitter includes a socket for wired electricity delivery. A charge is configured to be received wirelessly from the transmitter by a receiver in electrical communication with an electronic device. The system may include at least one of a controller and a power converter, wherein the controller is configured to control operation of the system and the power converter is configured to adjust the power from a power source to a form specified for use by the wireless charge transmitter.

In some embodiments, a standard wall plate of the standard wall electrical receptacle housing is configured to be mounted to the wall electrical receptacle housing with the wireless charge transmitter housed within the wall electrical receptacle housing. The wireless charge transmitter may be configured to transmit the charge using induction, resonant magnetic induction, electromagnetic radiation, and microwave and/or laser signals. The wireless charge transmitter may be configured to transmit a beacon.

In various embodiments, the wall plate may include a logo indicating a capability of the receptacle and/or the system. The system may include an indicator, such as a light or other display, configured to communicate a state of readiness of the system. A resonance frequency of the wireless charge transmitter and/or the wireless charge receiver may be dynamically adjusted. One or both resonance frequencies of the wireless charge transmitter and/or the receiver may be adjusted so that the two resonance frequencies match.

In various embodiments, transmission of the wireless charge is suspended in response to the system self-detecting a lack of the receiver to receive the charge. The system may include electrical and/or mechanical properties designed to orient the charge away from a wall coupled with the wall electrical receptacle housing.

In various embodiments, the system may transmit the charge to the receiver in response to the receiver providing access data to the system. The system may allocate wireless charge signal transmission based on a factor, such as tenure in the system, status level, subscription level, need of charge, and timing of the request for charge. In various embodiments, a standard wall socket is removed from the wall electrical receptacle housing prior to installation of the wireless charge transmitter. The power source of the wireless charge transmitter is received via the power converter directly from a wire entering the wall electrical receptacle housing. Thus, there is no intervening plug and socket used in powering the wireless charge transmitter.

The system may be configured to operate in response to signals from a timer and/or a controller. The controller may be configured to control operation of the system. The power converter may be configured to adjust the power from a power source to a form specified for use by the wireless charge transmitter. The system may conform to a wireless charge transmission standard.

Also disclosed is a method of wireless charge transmission including receiving an electrical signal from a power source by a wireless charge transmitter via a power converter directly from a wire entering an electrical receptacle housing. The method may include converting the electrical signal to a power level specified for use by the wireless charge transmitter and transmitting a wireless charge signal via the wireless charge transmitter to a receiver. The receiver may be configured to convert the received wireless charge signal to a charge for a power storage device of an electrical device.

Further disclosed is a method of wireless charge receiving including receiving, by a receiver coupled to an electrical device, a wireless electrical charging signal from a wireless charge transmitter. A power converter of the wireless charge transmitter may be configured to receive an electrical power signal directly from a wire entering an electrical receptacle housing. The method may include converting the wireless electrical charging signal to a charge for a power storage device of an electrical device power source.

BRIEF DESCRIPTION OF THE DRAWINGS

Other systems, methods, features, and advantages of the present disclosure will be or will become apparent to one with skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the features of the present disclosure. In the drawings, like reference numerals designate like parts throughout the different views, wherein:

DETAILED DESCRIPTION

In general, wireless energy transfer or wireless power is the transmission of a signal from a power source to an electrical load without a conductive, physical connection. In various embodiments and as shown throughout the various figures, the charging system 100 is configured to wirelessly transmit power using direct induction, resonant magnetic induction, and/or electromagnetic radiation, such as by microwave or by laser.

Figure 1:
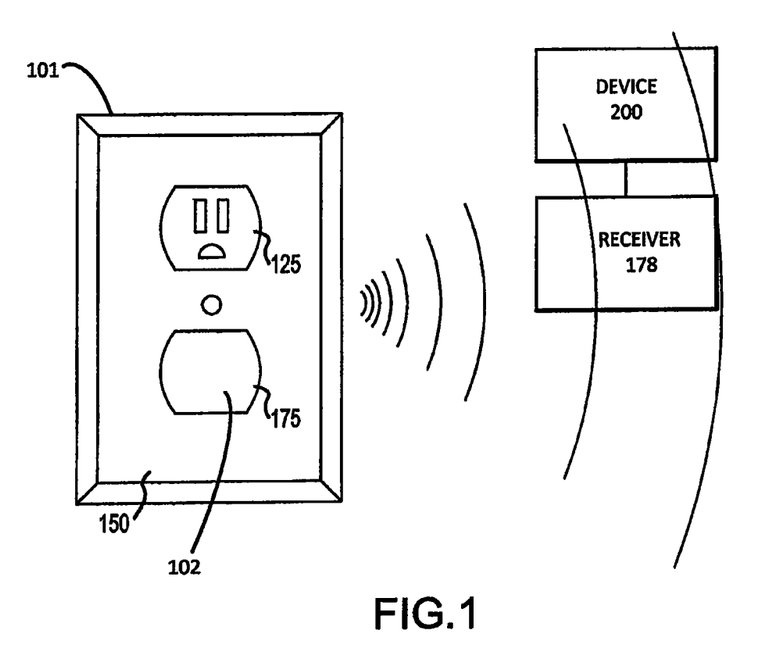
FIG. 1 depicts an electronic device coupled to a receiver in signal communication with a charging module according to an exemplary embodiment of the present invention.

In an exemplary embodiment and as shown by FIG. 1, elements of the charging system 100 are configured to be housed in a standard receptacle housing 101. This standard receptacle housing 101 may be embedded in a wall, ceiling and/or floor of a structure. The standard receptacle housing 101 may be any suitable receptacle housing, such as one configured for sockets/outlets as found in a typical building construction. A wireless charging module 102 is configured to be received by the standard receptacle housing 101. The standard receptacle housing 101 may be configured to provide a place/port (e.g., an electric socket 125) in a wiring system where electrical current can be accessed to operate/charge electrical devices. The electric socket 125 may be an alternating current (AC) electric socket, such as a 15A or 20A socket. The charging system 100 includes a first mounting bracket 302 and a second mounting bracket 304 (shown in FIG. 3) that define a longitudinal axis and are configured to be mounted to the wall, ceiling and/or floor the structure. In some embodiments, the wireless charging module 102 and the electric socket 125 may be positioned between the first mounting bracket 302 and the second mounting bracket 304.

In one embodiment, the wireless charging module 102 may be configured to provide a wireless charging signal (e.g., via a transmitter 175 of the wireless charging module 102). As disclosed above, the wireless charging signal of the wireless charging module 102 may be of any suitable type, such as induction, resonant magnetic induction, and/or electromagnetic radiation, such as by microwave or by laser. The wireless charging module 102 is configured to fit in place of a standard electric socket in the standard receptacle housing 101, such as to replace one of the electrical sockets 125. For example, an existing electrical socket may be removed and the wireless charging module 102 may replace it seamlessly in the removed electrical socket's former location. Such replacement may occur without modification of an existing standard face plate 150, and/or the existing standard receptacle housing 101. In such an embodiment, the existing standard face plate 150 may be used in concert with the wireless charging module 102. Although only one wired electrical socket 125 is depicted in the various Figures, the system 100 contemplates a plurality of electrical sockets 125 being provided with the wireless charging module 102. In one embodiment, the wireless charging module 102 is configured to be placed adjacent to a standard electric socket in the standard receptacle housing 101. Elements of the charging system 100 may be recessed in the standard receptacle housing 101, as discussed in greater detail herein.

The charging system 100 may include or be configured to operate with a wireless charging signal receiver 178. For example, the wireless charging signal receiver 178 may be in electrical communication with a device 200 to be charged. The wireless charging signal receiver 178 may be housed on the device 200, within the device 200, or be coupled to the device 200 via an electrical or conductive pathway. In various embodiments, the wireless charging signal receiver 178 may be coupled to more than one device 200 substantially simultaneously. The wireless charging signal receiver 178 may include a number of components in electrical connection with one another, for example, an antenna and a microchip or other processor. The wireless charging signal receiver 178 may conform to a particular standard or to a number of wireless charging standards for communicating with the transmitter 175 of the charging system 100. This standard may be any of a variety of wireless charging standards, such as those developed and/or adopted by Qi, WiPower, Underwriters Laboratories, CEA, etc. The transmitter 175 and/or the wireless charging module 102 may also be configured to conform to this wireless charging standard.

The device 200 may be any electronic device, such as a mobile phone (e.g., a smart phone), a wireless music player, a tablet computer, a notebook, an e-reader, a robot, a remote control, a watch, a light, a vacuum, a computer, a display, a camera, various push to talk devices, medical devices or implants, wearable electronics (e.g., clothing or jewelry), prosthetics, personal digital assistant ("PDAs") devices and/or the like. The device 200 may send a signal, such as an interrogation signal, to the wireless charging module 102 (e.g., a controller of the wireless charging module 102) to locate the charging system 100 or a component of the charging system 100. In various embodiments, the device 200 may be preprogramed to locate itself within a distance compatible with transfer of a charge, such as based on a signal from the charging system 100. For example, a robot may include programing to locate and autonomously direct itself to a charging location based on a signal from the wireless charging module 102 and/or preprogramed instructions. The device 200 and/or the wireless charging signal receiver 178 connected with the device 200 may be configured to display an indication of wireless charging signal strength. The device 200 and/or the wireless charging signal receiver 178 may be configured to display a suggestion of which direction to travel to increase the wireless charging signal strength.

Figure 2:
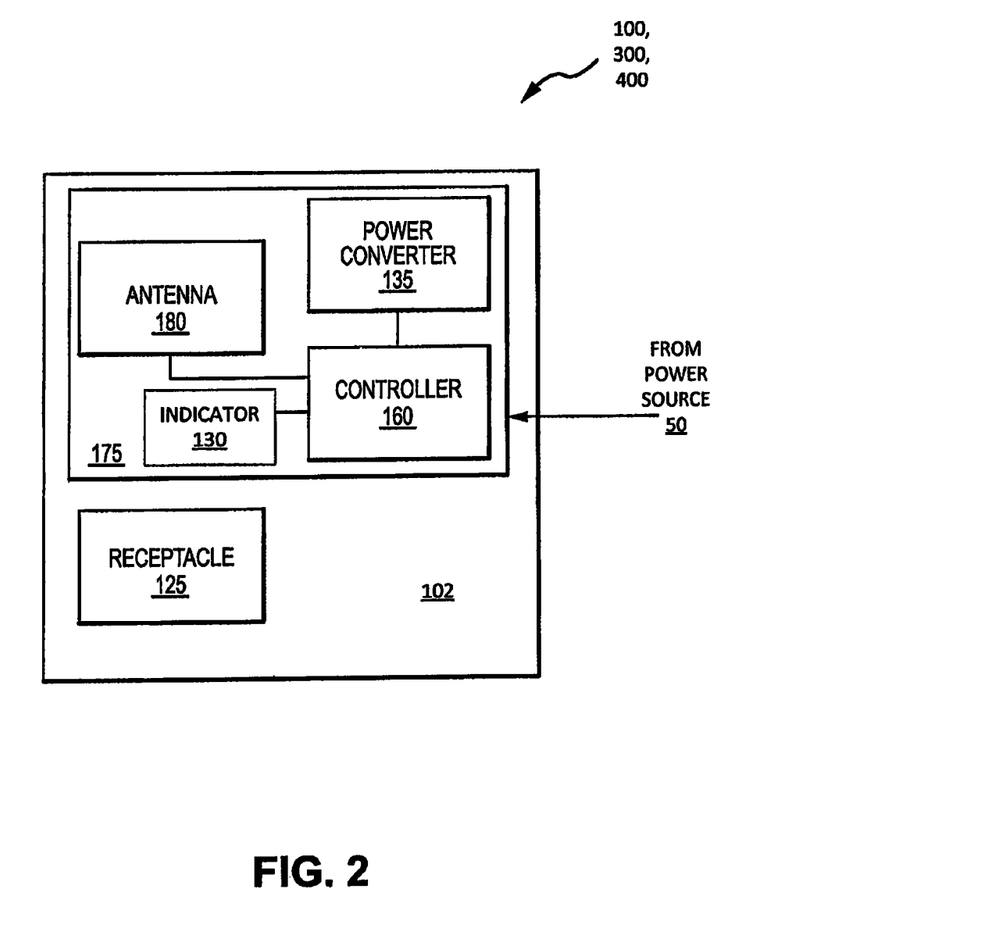
FIG. 2 depicts a block diagram of elements of a charging system according to an exemplary embodiment of the present invention.

Turning next to FIG. 2 and with reference to FIG. 1, a block diagram of elements of a wireless charging system 100 is shown. In various embodiments, a wireless controller 160, such as a microprocessor, may control power from a power source 50 to a power level desired at the wireless charging module 102 for appropriate propagation of the wireless charging signal. The wireless controller 160 may be in electrical communication with a power converter 135. The power converter 135 may convert power from the power source 50 to the power desired at the wireless charging module 102.

In various embodiments, the transmitter 175 includes an antenna 180 coupled to the power converter 135 and/or the wireless controller 160. The transmitter 175 may be configured to transmit the charging signal to a receiver 178 (see FIG. 1) in the proper format. The charging system 100 may be configured to direct the wireless charging signal in a desired direction. For instance, the charging system 100 may comprise an electrical and/or physical configuration to direct the wireless charging signal away from the standard receptacle housing 101 (see FIG. 1), such as away from a wall containing the standard receptacle housing 101 and out into a room. The charging system 100 may also be configured to shield and/or reflect the wireless charging signal away from the standard receptacle housing 101.

In various embodiments, the wireless charging module 102 may include an indicator 130. The indicator 130 is configured to communicate states of operation of the charging system 100 and/or its associated elements. For example, the indicator 130 may be configured to indicate states of ready, error, reset, charging, off, and/or the like. The indicator 130 may be housed on the wireless charging module 102 or be remote from the wireless charging module 102 and in electrical communication with the wireless charging module 102. The indicator 130 may be one or more lights, such as an LED light, and/or a more complex display, such as an LCD display configured to display text or other indicia.

Figure 3:
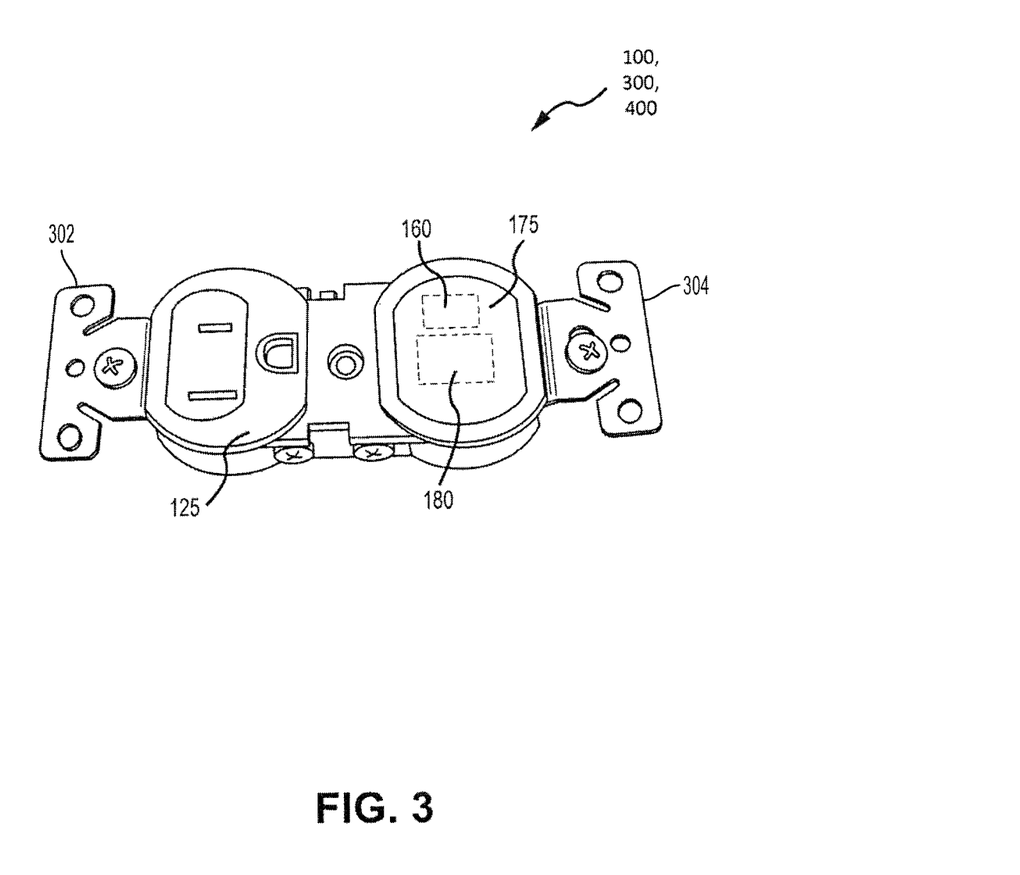
FIG. 3 depicts a charging module according to an exemplary embodiment of the present invention.
Figure 4:
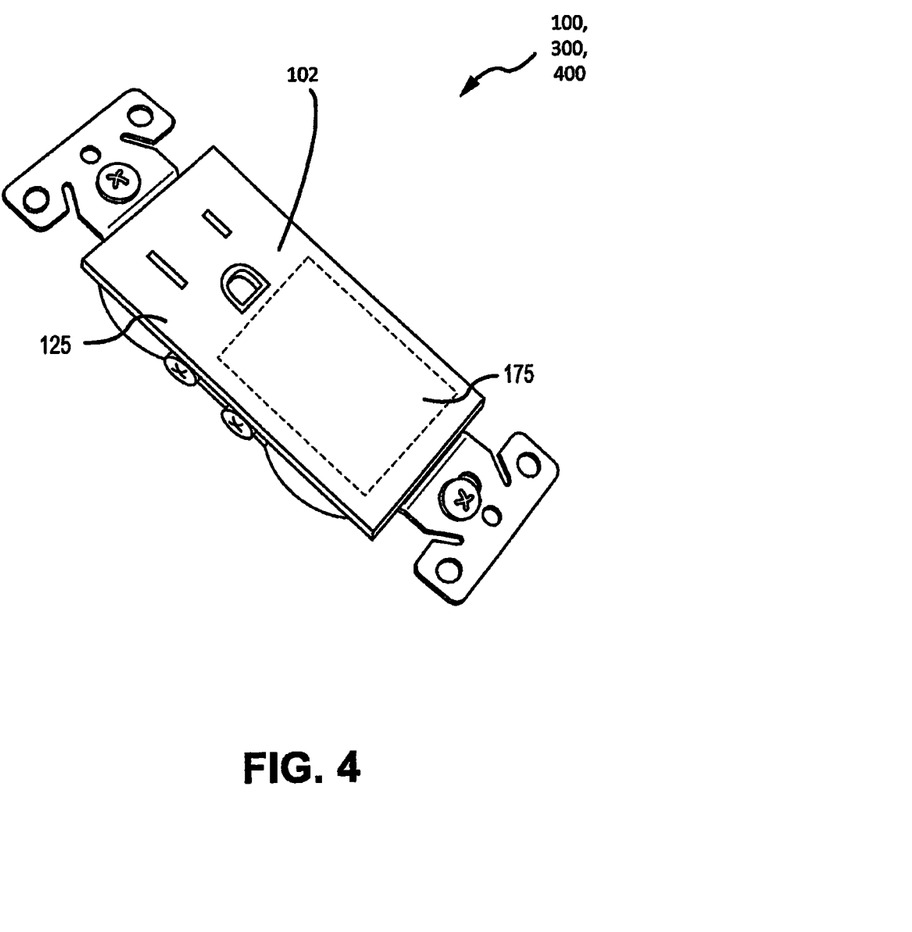
FIG. 4 depicts an alternative charging module according to an exemplary embodiment of the present invention.

As previously discussed for FIG. 1, the face plate 150 of the charging system 100 may be a standard face plate such that it has dimensions or measurements to appropriately fit with standard, common or typical receptacle housings. With reference to FIGS. 3 and 4, in various exemplary embodiments, the charging system 100 is configured to be used with and have a form factor for integration into a standard receptacle housing 101 location (with the previous socket removed) and used with the standard face plate 150. Thus, the charging system 100 may utilize the electrical socket 125 and the transmitter 175 incorporating the wireless controller and the antenna according to a standardized configuration to allow for simple replacement of an existing charging outlet.

Figure 5:
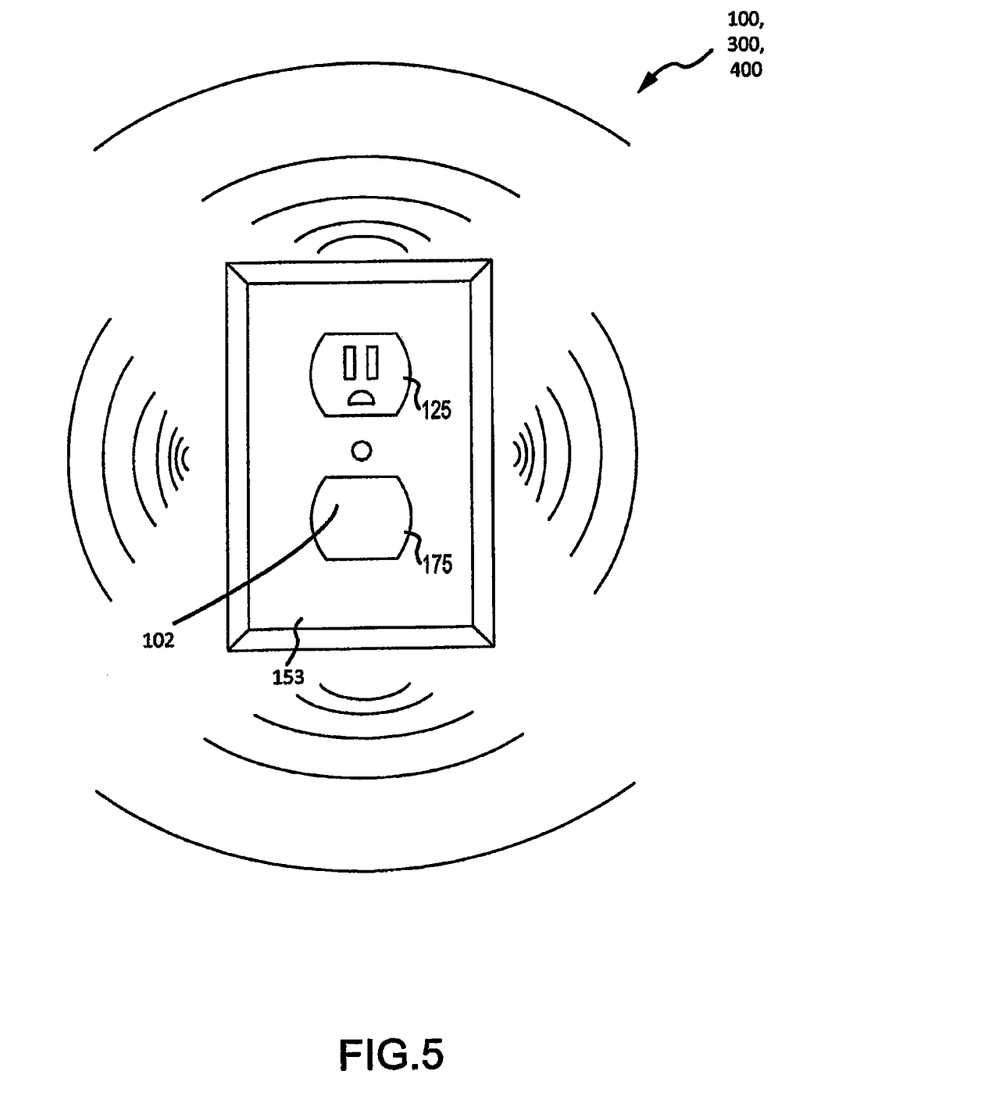
FIG. 5 depicts a system transmitting a wireless charging signal and providing a socket for wired power according to an exemplary embodiment of the present invention.

Turning next to FIG. 5, the charging system 100 may utilize a face plate 153 that is configured to minimize interference of the wireless charging signal from the transmitter 175 and/or the antenna 180. For instance, the face plate 153 may act as a radome. In various embodiments, the face plate 153 may be configured to indicate that the charging system 100 is configured and/or able to provide a wireless charging signal, such as with a logo, text or other indicator to a user.

In one embodiment, the face plate 153 may be integral to the wireless charging module 102. For example, the face plate 153 may include properties for transmitting a wireless charging signal and be in electrical communication with one or more components of the wireless charging module 102. In one embodiment, the face plate 153 may include an antenna (such as the antenna 180) embedded in the face plate 153 or positioned on or in an external surface the face plate 153 for transmitting/receiving signals. In another embodiment, the face plate 153 may include an indicator (such as the indicator 130).

In various embodiments, the wireless charging module 102 may be configured to self-detect (e.g., by detecting a low rate of frequency) that the device 200 is in the vicinity. It may propagate a wireless charging signal based on this self-detection. This self-detection does not utilize receiving active communications from the device 200.

The wireless charging module 102 may be configured to passively transmit a beacon. This beacon may be used to test and/or calibrate various antennas and/or receivers of the charging system 100, such as the receiver 178 coupled to the device 200. This beacon may be used as an interrogation signal and may include power and data communication. Such communication may further enable the wireless charging module 102 to dynamically operate, for example, by broadcasting a wireless charging signal in response to receiving a communication from the device 200 when the device 200 is capable of and/or is desirous of coupling to the system 100. This on-demand wireless charging signal propagation reduces power source 50 electricity costs and electricity waste. Similarly, the device 200 may also transmit information regarding its power charging characteristics or needs (e.g., charging complete, charging at 95 percent, charging at 50 percent, charging at 5 percent, etc.). In this way, the wireless charging module 102 may stop transmitting the wireless charging signal when the device 200 is fully charged and/or near fully charged.

In various embodiments, the controller 160 may allocate resources in response to signals received from a plurality of electrical devices 200 capable of receiving charge. In one embodiment, a particular device 200 may receive preferential allocation based on tenure in the system, status, subscription level, need of charge, and/or timing. This allocation of resources may be dynamic. For example, if a device 200 with a greater charging need enters a radius of the charging signal during the charge of one or more other devices 200, the charging system 100 may alter the resonance frequency of the propagating signal to that of the receiver 178 coupled to the needy device 200. Additional devices 200 may receive or be configured with this resonance frequency data bandwidth permitting. In an alternative embodiment, the system 100 may be operated in a first-in first-out ("FIFO") manner with a counter configured to track timing of the devices 200 entering the radius of communication with the wireless charging module 102.

In various embodiments, the charging system 100 may be configured to operate on a timer, such as during business hours. In such an embodiment, the controller 160 may be programed to limit power delivery of the wireless transmitter 175 and/or the electric socket 125. In other embodiments, the charging system 100 may be configured to operate in response to receipt of a security code. For instance, the device 200 and/or user of the device 200 may be required to be cleared prior to using the charging system 100. A user may transmit information to a central hub (e.g., a database) via a user interface. The central hub may be capable of transmitting information to the controller 160. A user may transmit information directly to the controller 160 via a receiver coupled to the controller 160. The granting of this security code may be based on the user paying a fee and/or signing up for a subscription to the system or a partner provider's goods and/or services. The device 200 may be configured to provide data prior to the transmitter 175 or the receiver 178 dynamically adjusting a resonant frequency to wirelessly transfer a signal, for example, as described in greater detail below.

With reference to FIG. 2, a system 300 may be configured such that the two-part transformer is utilized for coupling between the power source 50 and the device 200 for storing a charge. Certain aspects of the system 300 may be the same or similar to the charging system 100. The first part of the two-part transformer may be the wireless charging module 102 in communication with the power source 50 and the second part of the two-part transformer may be the receiver 178 in communication with the device 200 capable of storing the charge. Thus, for example, in response to the first part of the transformer being electrically coupled to the second part of the transformer, a complete transformer is created and charge may wirelessly flow.

More specifically, the system 300 may be configured to utilize an electromagnetic field to transfer energy between two objects. Energy may be sent through an inductive coupling to the device 200, which can use that energy to charge batteries and/or store the energy in a power storage device, such as a capacitor. Due to a gap between the first part of the transformer (e.g., the wireless charging module 102) and the second part of the transformer (e.g., the receiver 178), two smart coils may be employed in each of the sender and receiver of the energy within the respective devices. In one embodiment, an induction coil is configured to create an alternating electromagnetic field from a charging base station (such as the wireless charging module 102), and a second induction coil coupled to the receiving device receiver (such as the receiver 178) takes power from the electromagnetic field and converts it back into electrical current to charge a battery of the device 200. The two induction coils thus combine to form an electrical transformer.

With reference to FIG. 1, an inductive coil of the system 300 may be located at or near the plane of the face plate 150. The diameter of the inductive coil may be any suitable diameter, such as between about 1 and 35 mm. A PC board layer may house control logic elements and control logic circuitry and be in electrical communication with the inductive coil. In various embodiments, a shielding layer, such as comprised of a ferrous plate and a copper plate, may be located proximate the PC board layer.

In another embodiment, a system 400 may be configured to utilize resonant inductive coupling or electrodynamic induction. Certain aspects of the system 400 may be the same or similar to the charging systems 100 or 300. Resonant inductive coupling is the near-field wireless transmission of electrical energy between two coils that are tuned to resonate at the same frequency, thus forming a resonant or resonance transformer. While many transformers employ resonance, resonant inductive couplings of the system 400 may be configured to have a high Q. Higher Q indicates a lower rate of energy loss relative to the stored energy of the oscillator (e.g., the oscillations die out more slowly). The resonant inductive couplings may be air cored to avoid iron losses.

With reference to FIG. 5, resonant transfer works by making a coil ring with an oscillating current for generating an oscillating magnetic field. As shown, the field may be propagated in all directions. However, in an alternative embodiment, the direction of the oscillating magnetic field may be targeted in a desired direction. Because the coil is highly resonant any energy placed in the coil may die away relatively slowly over a large number of cycles. If a second coil is brought near it, the second coil can pick up most of the energy before it is lost, even if it is some distance away (e.g., 3-5 meters). In various embodiments, the fields used are predominately non-radiative and near-field (sometimes called evanescent waves). In various embodiments, a receiving unit of the system 400 (such as the receiver 178) is located within the ¼ wavelength distance of the transmitter 175 to maximize the energy transfer of the resonant transfer.

In various embodiments, the receiver 178 may be configured to dynamically adjust the resonant frequency of the receiver 178 in order to match the resonant frequency of the wireless charging module 102. Similarly, in various embodiments, the wireless controller 160 may be configured to dynamically adjust the resonant frequency of the wireless charging module 102 in order to match the resonant frequency of the receiver 178. In such embodiments, the wireless charging module 102 may be configured to communicate (e.g., receive information regarding the presence and resonant frequency of the receiver 178). Thus, the wireless charging module 102 may include a receiver, transmitter and/or transceiver.

Figure 6:
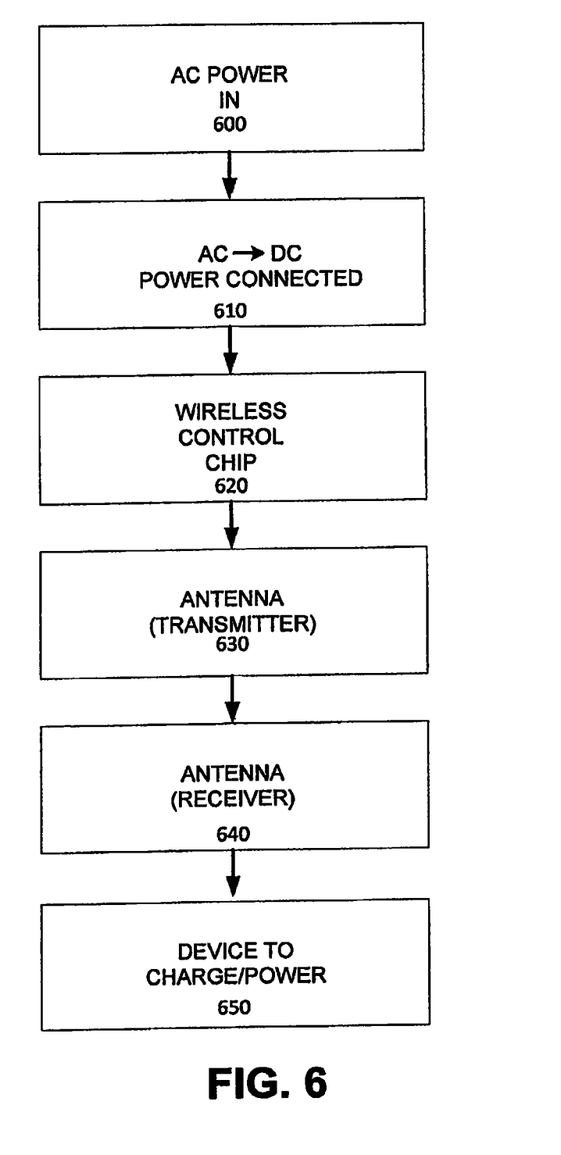
FIG. 6 depicts an electrical power process flow according to an exemplary embodiment of the present invention.

Turning next to FIG. 6 and with reference to the various figures, a process flow of power from the power source 50 to the device 200 is depicted. At flow block 600, power (e.g., AC power) is initially received by the system 100. As previously stated, this may be in response to an on demand scenario. At flow block 610, the device 200 with charging needs may enter into the radius of the wireless charging signal so that power may be connected for charging purposes. At flow block 620, the power converter 135 and the controller 160 of the transmitter 175 or other wireless control chip may configure the AC power into the format desired by the wireless charging module 102 in order to charge the device 200. At flow blocks 630 and 640, the wireless charging signal may then be transmitted by the transmitter 175 to the receiver 178 coupled to the device 200, respectively. At flow block 650, in response to receiving the signal from the transmitter 175, the receiver 178 converts the received signal into a form usable by the device 200 to recharge its power storage device.

Systems, methods and computer program products for wireless charging have been provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. In addition, as will be appreciated by one of ordinary skill in the art, the embodiments disclosed above may be embodied as a customization of an existing system and/or as an add-on product.

The steps of a method or algorithm described in connection with the embodiments disclosed above may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The system and/or method may be described in terms of functional block components, screen shots, optional selections and various processing steps. Such functional blocks may be realized by any number of hardware and/or software components configured to perform the specified functions. For example, the system and/or method may employ various integrated circuit components (e.g., memory elements, processing elements, logic elements, look-up tables, and the like) which may carry out a variety of functions under the control of one or more microprocessors or other control devices. Similarly, the software elements of the system may be implemented with any programming or scripting language (e.g., VPL, C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML)) with the various algorithms being implemented with any combination of data structures, objects, processes, routines or other programming elements. Further, it should be noted that the system and/or method may employ any number of conventional techniques for data transmission, signaling, data processing, network control, and the like.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An electrical socket comprising:
   a first mounting bracket and a second mounting bracket spaced apart, defining a longitudinal axis and configured to be coupled to at least one of a wall, a ceiling or a floor;
   a wireless charge transmitter coupled to the first mounting bracket and the second mounting bracket and configured to transmit a wireless charging signal;
   a power converter coupled to the wireless charge transmitter and configured to adjust source power from a power source to a specified power to be used by the wireless charge transmitter;
   a controller coupled to the wireless charge transmitter and configured to:
      authorize, using a security code, one or more receiver devices to receive the wireless charging signal,
      determine a respective power level for each of the one or more authorized receiver devices,
      allocate resources of the wireless charge transmitter based on the respective power level for each of the one or more authorized receiver devices, and
      instruct the wireless charge transmitter to transmit the wireless charging signal to at least one of the one or more authorized receiver devices based on the allocated resources; and
   a two prong or three prong electrical receptacle coupled to the first mounting bracket and the second mounting bracket and configured to receive a standard electrical plug to power an external device;
   wherein the wireless charge transmitter and the two prong or three prong electrical receptacle are configured to be positioned within a standard wall electrical socket housing.

2. The electrical socket of claim 1, wherein a standard wall plate of the standard wall electrical socket housing is mounted to the standard wall electrical socket housing when the wireless charge transmitter is positioned within the standard wall electrical socket housing.

3. The electrical socket of claim 1, further comprising a wall plate configured to replace a standard wall plate of the standard wall electrical socket housing and to minimize interference of the wireless charging signal.

4. The electrical socket of claim 1, wherein the wireless charge transmitter is configured to transmit the wireless charging signal using at least one of induction, resonant magnetic induction, electromagnetic radiation, microwave signals or laser signals.

5. The electrical socket of claim 1, wherein the wireless charge transmitter is configured to transmit a beacon to be received by the one or more authorized receiver devices and to be used by the one or more authorized receiver devices for calibration to receive the wireless charging signal.

6. The electrical socket of claim 1, wherein the controller is further configured to receive a signal from a respective receiver device of the one or more authorized receiver devices indicating a status of the respective receiver device and to instruct at least one of the power converter or the wireless charge transmitter to adjust the wireless charging signal based on the status of the respective receiver device.

7. The electrical socket of claim 1, wherein a resonant frequency of the wireless charge transmitter is configured to be dynamically adjusted.

8. The electrical socket of claim 7, wherein the receiver device has a dynamically adjustable resonant frequency for tuning to the resonant frequency of the wireless charge transmitter.

9. The electrical socket of claim 1, wherein the controller is further configured to instruct the wireless charge transmitter to stop transmitting the wireless charging signal to a respective receiver device of the one or more authorized receiver devices in response to the controller determining that the respective receiver device is not receiving the wireless charging signal.

10. The electrical socket of claim 1, wherein the wireless charge transmitter is configured to transmit a beacon usable by a respective receiver device of the one or more authorized receiver devices to output data suggesting a direction in which the respective receiver device should be moved to increase the strength of the wireless charging signal.

11. The electrical socket of claim 1, further comprising an electrical shield and wherein the wireless charge transmitter includes an antenna and the electrical shield is positioned between the antenna and the controller.

12. The electrical socket of claim 1, wherein the wireless charge transmitter is configured to transmit a beacon usable by a respective receiver device of the one or more authorized receiver devices to reposition itself to a location closer to the wireless charge transmitter than a current location of the respective receiver device.

13. The electrical socket of claim 1, wherein the controller is further configured to receive communication from the one or more authorized receiver devices and to instruct the wireless charge transmitter to transmit the wireless power signal in response to receiving the communication.

14. The electrical socket of claim 1, wherein the source power is received directly from a wire entering the standard wall electrical socket housing without electrically traversing a plug and socket.

15. The electrical socket of claim 1, further comprising an indicator configured to indicate a current state of the wireless power transmitter from a list of states including a ready state, an error state, a reset state, a charging state and an off state.

16. The electrical socket of claim 1, further comprising a wall plate coupled to the wireless charge transmitter and configured to transmit the wireless charging signal.

17. An electrical socket comprising:
a first mounting bracket and a second mounting bracket defining a longitudinal axis and configured to be coupled to at least one of a wall, a ceiling or a floor;
a wireless charge transmitter coupled to the first mounting bracket and the second mounting bracket such that the wireless charge transmitter is positioned between the first mounting bracket and the second mounting bracket along the longitudinal axis, the wireless charge transmitter configured to be positioned within a standard electrical socket housing and configured to generate a wireless charging signal;
a timer configured to determine a time of day;
a controller coupled to the wireless charge transmitter and the timer, the controller configured to determine whether a receiver device is authorized to receive the wireless charging signal, and in response to determining that the receiver device is authorized, limit power delivery of the wireless charging signal by the wireless charge transmitter to the authorized receiver device based on the time of day and instruct the wireless charge transmitter to transmit the wireless charging signal to the authorized receiver device, at least one of the first mounting bracket, the second mounting bracket, the wireless charge transmitter or the controller being configured to direct the wireless charging signal in a desired direction; and
a power converter coupled to the wireless charge transmitter and configured to adjust source power from a power source.

18. The electrical socket of claim 17, wherein the wireless charge transmitter is configured to transmit a beacon usable by the authorized receiver device to reposition itself to a location closer to the wireless charge transmitter than a current location of the receiver device.

19. The electrical socket of claim 17, further comprising an electrical shield and wherein the wireless charge transmitter includes an antenna and the electrical shield is positioned between the antenna and the controller.

20. The electrical socket of claim 17, wherein the wireless charge transmitter is configured to transmit a beacon usable by the authorized receiver device to output data suggesting a direction in which the authorized receiver device should be moved to increase the strength of the wireless charging signal.

21. An electrical socket comprising:
a first connection means and a second connection means configured to be coupled to a surface;
a wireless charge transmitter configured to be coupled to the first connection means and the second connection means and to generate a wireless power signal;
a power converter coupled to the wireless charge transmitter and configured to adjust source power from a power source to a specified power to be used by the wireless charge transmitter;
a controller coupled to the wireless charge transmitter and configured to:
determine a power level for each receiver device of a first set of receiver devices,
instruct the wireless charge transmitter to transmit the wireless charging signal to at least one receiver device of the first set of receiver devices based on the power level for each receiver device of the first set of receiver devices,
determine a power level for each receiver device of a second set of receiver devices, the second set of receiver devices being different than the first set of receiver devices, and
instruct the wireless charge transmitter to transmit the wireless charging signal to at least one receiver device of the second set of receiver devices based on the power level for each receiver device of the second set of receiver devices; and
a two prong or three prong electrical receptacle configured to be coupled to the first connection means and the second connection means and to receive a standard electrical plug,
wherein the wireless charge transmitter and the two prong or three prong electrical receptacle are configured to be positioned within a standard wall electrical socket housing.

22. The electrical socket of claim 21, further comprising an electrical shield and wherein the wireless charge transmitter includes an antenna and the electrical shield is positioned between the antenna and the controller.

23. The electrical socket of claim 21, further comprising an indicator configured to indicate a current state of the wireless power transmitter from a list of states including a ready state, an error state, a reset state, a charging state and an off state.

24. The electrical socket of claim 21, wherein the second set of receiver devices includes the first set of receiver devices and an additional receiver device that has a respective power level less than all other receiver devices in the second set, wherein to instruct the wireless charge transmitter to transmit the wireless charging signal to the at least one receiver device of the second set includes the controller being configured to instruct the wireless charge transmitter to transmit the wireless charging signal to the additional receiver device.

25. The electrical socket of claim 21, wherein the controller is configured to instruct the wireless charge transmitter to transmit the wireless charging signal to the at least one receiver device of the first set of receiver devices in a first order and instruct the wireless charge transmitter to transmit the wireless charging signal to the at least one receiver device of the second set of receiver devices in a second order, the second order being different than the first order.

* * * * *